(12) United States Patent
Kasai et al.

(10) Patent No.: US 8,226,002 B2
(45) Date of Patent: Jul. 24, 2012

(54) MAGNETIC CARD READER

(75) Inventors: Yoshiaki Kasai, Inagi (JP); Noboru Ishii, Inagi (JP); Toshiyuki Kobayashi, Inagi (JP); Toshiyuki Ichikawa, Inagi (JP)

(73) Assignee: Fujitsu Frontech Limited, Inagi-shi (JP)

( * ) Notice: Subject to any disclaimer, the term of this patent is extended or adjusted under 35 U.S.C. 154(b) by 0 days.

(21) Appl. No.: 13/195,390

(22) Filed: Aug. 1, 2011

(65) Prior Publication Data

US 2011/0284636 A1  Nov. 24, 2011

Related U.S. Application Data

(63) Continuation of application No. PCT/JP2009/061934, filed on Jun. 30, 2009.

(51) Int. Cl.
  *G06K 7/08* (2006.01)
  *G06K 19/06* (2006.01)
(52) U.S. Cl. ......... 235/449; 235/493
(58) Field of Classification Search ......... 235/492, 235/493, 449; 283/72; 174/36, 390; 428/221; 324/500; 361/220
See application file for complete search history.

(56) References Cited

U.S. PATENT DOCUMENTS

| | | | | |
|---|---|---|---|---|
| 5,989,696 | A * | 11/1999 | McCarthy et al. | 428/221 |
| 6,147,302 | A * | 11/2000 | Matsuo et al. | 174/390 |
| 6,255,948 | B1 * | 7/2001 | Wolpert et al. | 340/572.8 |
| 6,410,847 | B1 * | 6/2002 | Allen et al. | 174/390 |
| 6,506,972 | B1 * | 1/2003 | Wang | 174/36 |
| 6,817,689 | B1 * | 11/2004 | Annacone | 283/72 |
| 7,012,796 | B2 * | 3/2006 | Chen et al. | 361/220 |
| 7,225,994 | B2 * | 6/2007 | Finkelstein | 235/493 |
| 7,677,462 | B2 * | 3/2010 | Hynes et al. | 235/492 |
| 7,931,207 | B2 * | 4/2011 | Holmes et al. | 235/493 |
| 2003/0234651 | A1 * | 12/2003 | Nguyen | 324/500 |
| 2006/0283958 | A1 * | 12/2006 | Osterweil | 235/492 |
| 2008/0210757 | A1 * | 9/2008 | Burden et al. | 235/449 |

FOREIGN PATENT DOCUMENTS

| | | | |
|---|---|---|---|
| JP | 2-021463 A | | 1/1990 |
| JP | 2-021464 A | | 1/1990 |
| JP | 2-308473 A | | 12/1990 |
| JP | 6-011059 U | | 2/1994 |
| JP | 8-227576 A | | 9/1996 |
| JP | 08227576 A | * | 9/1996 |
| JP | 11-007500 A | | 1/1999 |
| JP | 2000-207878 A | | 7/2000 |
| JP | 2000207878 A | * | 7/2000 |

OTHER PUBLICATIONS

International Search Report of PCT/JP2009/061934, mailing date Oct. 6, 2009.

* cited by examiner

*Primary Examiner* — Thien T Mai
(74) *Attorney, Agent, or Firm* — Westerman, Hattori, Daniels & Adrian, LLP

(57) ABSTRACT

A conductive fixed static elimination member is provided in a before-magnetic head travel portion which guides a magnetic card to a magnetic card reader unit provided with a magnetic head, such that a protuberance portion thereof protrudes into a card travel groove through an opening formed in one of side walls, and has a conductive cleaning pad affixed to a surface thereof. The magnetic card inserted in the before-magnetic head travel portion is cleaned by the cleaning pad, and if the magnetic card has static electricity, it is possible to eliminate the static electricity by discharging the static electricity to the ground via the cleaning pad having conductivity, the fixed static elimination member, and a magnetic card reader fixing bracket.

8 Claims, 10 Drawing Sheets

MAGNETIC CARD READER

This application is a continuing application, filed under 35 U.S.C. §111(a), of International Application PCT/JP2009/061934, filed on Jun. 30, 2009.

FIELD

The embodiments discussed herein are related to a magnetic card reader.

BACKGROUND

Magnetic cards are used for cash cards, patient registration cards, membership cards, security cards and the like, and a long and narrow magnetic stripe embedded in a surface of a magnetic card has digital data such as a number for identifying a user, magnetically recorded therein. As a device for reading data recorded in such a magnetic card, there has been proposed a magnetic card reader configured to read data through manual operation of a magnetic card by the user.

The magnetic card reader has a card travel groove formed by erecting a pair of side walls parallel to each other on a card sliding base surface that guides a side of a magnetic card, and a magnetic head disposed in an opening formed in one of the side walls, for reading data recorded in the magnetic stripe of the magnetic card. The magnetic head is supported on the side wall such that a surface of the magnetic head for being brought into contact with the magnetic stripe protrudes into the card travel groove in a manner capable of moving in a direction of retraction from the card travel groove. With this arrangement, when the magnetic card is caused to travel from one end to the other end of the card travel groove, the magnetic card is brought into abutment with the magnetic head protruding in the card travel groove, and then travels while pushing away the magnetic head in the direction of retraction from the card travel groove. At this time, the magnetic head is brought into contact with the magnetic stripe to read the data in the magnetic stripe.

If the magnetic card is used in an electrostatically charged state, the magnetic card reader is caused to discharge the static electricity via the magnetic head which is in contact with the magnetic stripe. This sometimes causes a control circuit electrically connected to the magnetic head to erroneously operate, or causes a circuit element to be damaged. To prevent such a problem, there has been proposed a magnet card reader which has a static elimination mechanism disposed at a before-magnetic head travel portion, for eliminating the static electricity charged on the magnetic card before the magnetic card is brought into contact with the magnetic head (see e.g. Japanese Laid-open Patent Publication No. 2000-207878).

The magnetic card reader described in Japanese Laid-open Patent Publication No. 2000-207878 is constructed such that a metallic shutter member is disposed at a slot-like insertion opening via which a magnetic card is inserted, for covering the whole insertion slot when the magnetic card is not inserted. When the magnetic card is inserted, the metallic shutter member is brought into contact with the whole lateral width of the magnetic card to thereby eliminate the charged static electricity.

Further, the magnetic head of the magnetic card reader is exposed in the card travel groove where the magnetic cared travels, and is brought into direct contact with the magnetic stripe of the magnetic card. Therefore, the magnetic head sometimes gets dust floating in the air depending on the installation environment. Further, while using the magnetic card, dirt attached to a surface of the magnetic card may transfer to the magnetic head. To prevent such a problem, it is necessary to perform maintenance such as regular cleaning of the magnetic head using a cleaning card. In view of this, there has been proposed a magnetic card reader that prevents the magnetic head from getting dirty by disposing a belt-like dust absorbing member for cleaning a magnetic card in a card travel groove, and bringing the cleaned magnetic card into contact with a magnetic head (see e.g. Japanese Laid-open Patent Publication No. 08-227576).

According to the magnetic card reader described in Japanese Laid-open Patent Publication No. 08-227576, the belt-like dust absorbing member extending in a direction of the card travel groove is disposed at a portion of one of side walls of the card travel groove, at a location closer to a slit opening of the card travel groove than the magnetic head is. With this arrangement, when the magnetic card is inserted from the slit opening into the card travel groove in a direction perpendicular to a travel direction, the magnetic card moves to the card sliding base surface while being brought into contact with the dust absorbing member, and at this time, the magnetic stripe is cleaned when passing the dust absorbing member.

However, the magnetic card reader described in Japanese Laid-open Patent Publication No. 2000-207878 is configured to eliminate static electricity using the metallic shutter member provided for preventing dust from entering inside, so that the magnetic card reader of this type is not applicable to that of a type in which the magnetic card is caused to travel along the card travel groove because there is not enough space available therefor. Further, the magnetic card reader described in Japanese Laid-open Patent Publication No. 08-227576 is of a type in which the magnetic card is inserted into the card travel groove from the slit opening in the direction perpendicular to the travel direction, so that there is a problem that the magnetic card reader of this type is not applicable for that of a type in which a magnetic card is inserted in the travel direction, because the magnetic stripe is not brought into contact with the dust absorbing member.

SUMMARY

According to an aspect of the invention, there is provided an magnetic card reader that reads data recorded in a magnetic card by inserting the magnetic card in a card travel groove in a travel direction and manually causing the magnetic card to travel along the card travel groove, wherein a static elimination member and a cleaning member are disposed at a location before the magnetic head in a direction of travel of the magnetic card, in a manner protruding into the card travel groove.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates variations of the fixed static elimination member, in which

DESCRIPTION OF EMBODIMENTS

Figure 1:
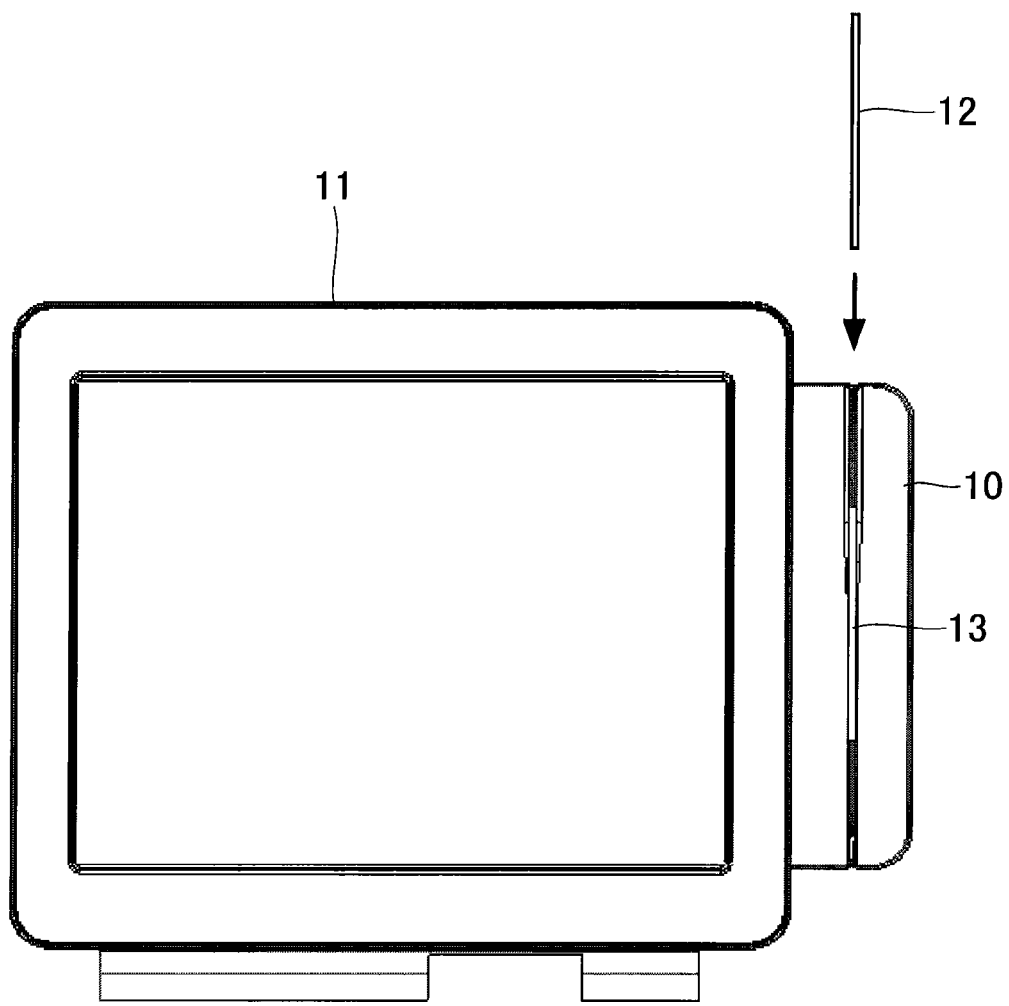
FIG. 1 is a view showing the appearance of an installation example of a magnetic card reader of a type in which a magnetic card is caused to pass therethrough.

Embodiments of the present invention will be explained below with reference to the accompanying drawings, wherein like reference numerals refer to like elements throughout.

Hereafter, a detailed description will be given embodiments of the present invention in which the invention is applied to a magnetic card reader of a type in which data recorded in a magnetic card is read by inserting the magnetic card in a travel direction of a card travel groove, and manually causing the magnetic card to travel along the card travel groove, and then the magnetic card in this state is caused to pass through the card travel groove, and a magnetic card reader of a type in which the magnetic card in the aforementioned state is not caused to pass through the card travel groove, by way of example, with reference to the drawings.

Figure 2:
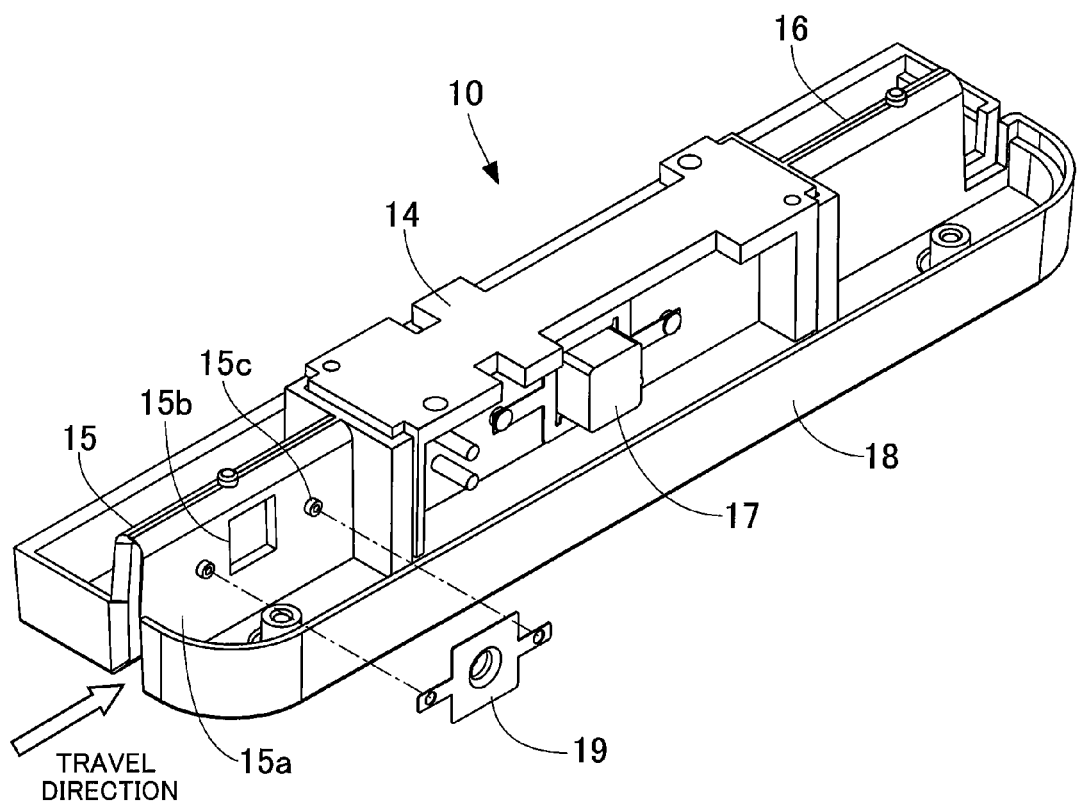
FIG. 2 is an exploded perspective view of essential parts of the magnetic card reader according to a first embodiment, as viewed from a bottom side.
Figure 3:
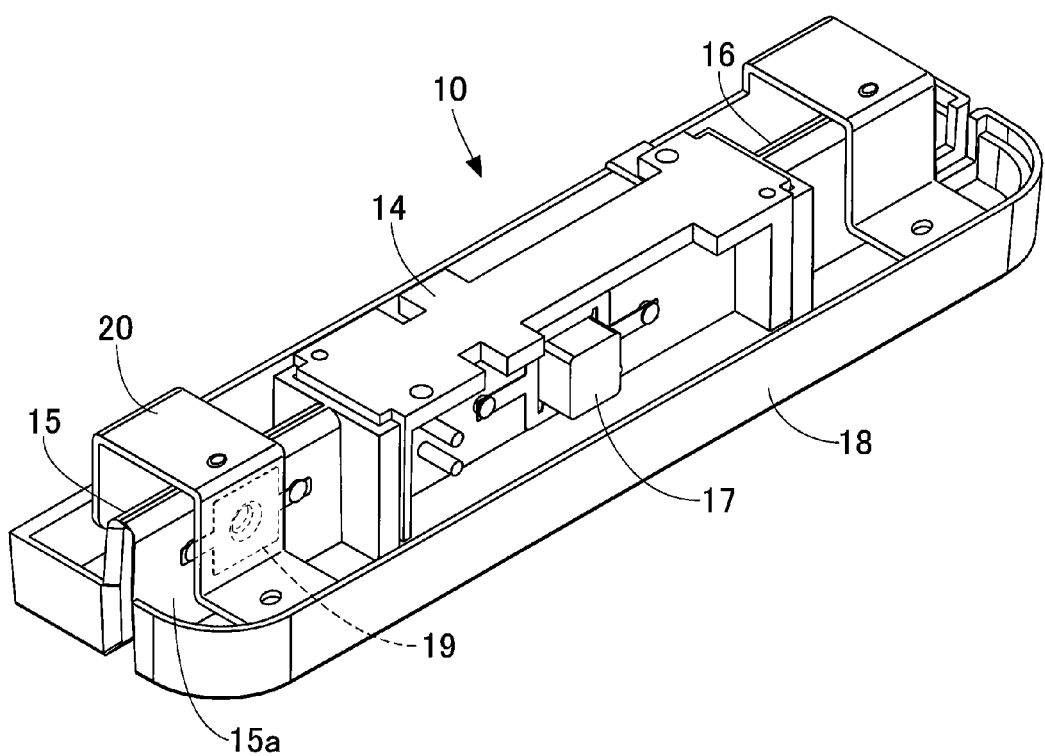
FIG. 3 is a perspective view of the magnetic card reader, which illustrates a method of grounding a fixed static elimination member.
Figure 4:
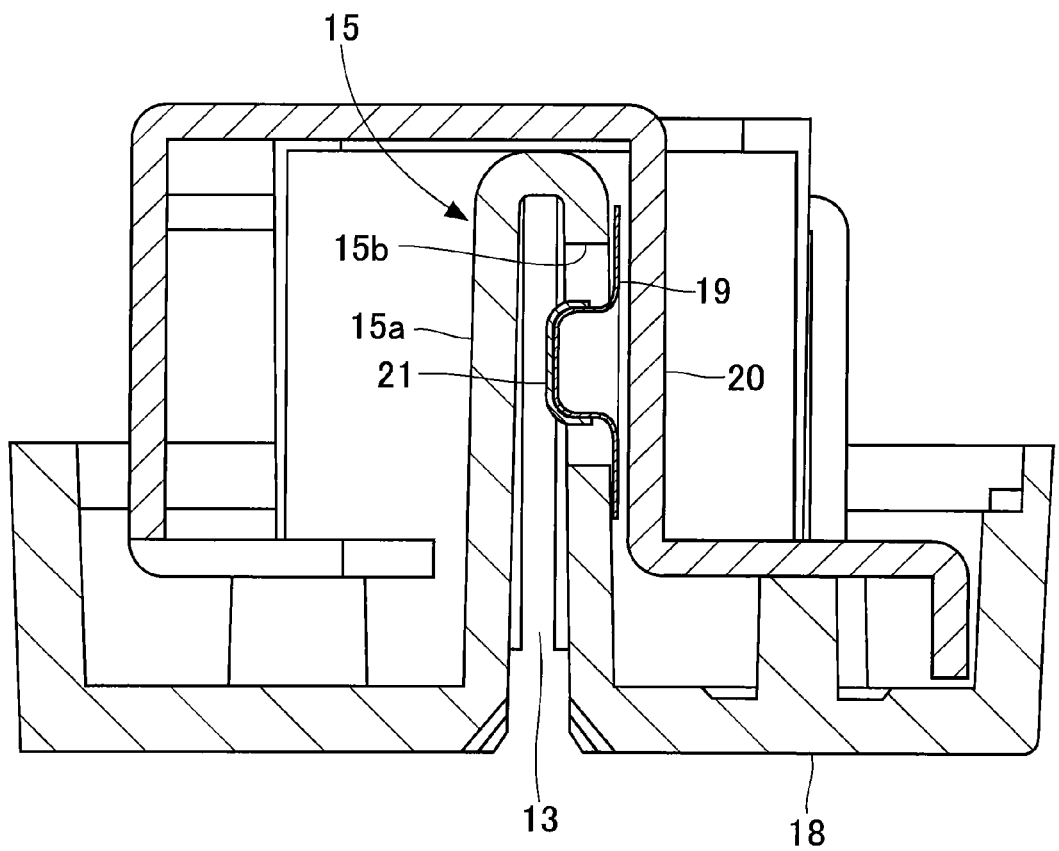
FIG. 4 is a cross-sectional view illustrating a mounted state of the fixed static elimination member.

FIG. 1 is a view showing the appearance of an installation example of a magnetic card reader of a type in which a magnetic card is caused to pass through the magnet card reader, FIG. 2 is an exploded perspective view of essential parts of the magnetic card reader according to a first embodiment, as viewed from a bottom side, FIG. 3 is a perspective view of the magnetic card reader, which illustrates a method of grounding a fixed static elimination member, and FIG. 4 is a cross-sectional view illustrating a mounted state of the fixed static elimination member.

A magnetic card reader 10 is mounted on a side of an information terminal 11, for example, as illustrated in FIG. 1, for reading data recorded in a magnetic card 12 and inputting the read data to the information terminal 11. The magnetic card reader 10 has a card travel groove 13 which extends therethrough from above to below, as viewed in FIG. 1, and when reading data, the operation is manually performed such that the magnetic card 12 is inserted in the card travel groove 13 from the upper end as viewed in FIG. 1, moved along the card travel groove 13, and removed from the lower end as viewed in FIG. 1.

The magnetic card reader 10, as illustrated in FIG. 2, includes a magnetic card reader unit 14, a before-magnetic head travel portion 15, and an after-magnetic head travel portion 16. The magnetic card reader unit 14 has a magnetic head 17 mounted on one of side walls forming the card travel groove 13 such that a sliding surface thereof protrudes into the card travel groove 13. When the magnetic card 12 travels, the magnetic head 17 is pushed away by the magnetic card 12 in a direction of retraction from the card travel groove 13, and reaction to being pushed away maintains a contact state with the magnetic card 12.

The before-magnetic head travel portion 15 and the after-magnetic head travel portion 16 are integrally formed with a front cover 18 such that the magnetic card reader unit 14 is fitted in therebetween. The before-magnetic head travel portion 15 and the after-magnetic head travel portion 16 are formed to guide the traveling of the magnetic card 12, and is connected to the magnetic card reader unit 14 to form the card travel groove 13.

The before-magnetic head travel portion 15 is disposed at a location closer to where the magnetic card 12 is inserted than the magnetic card reader unit 14, and in FIG. 1, the location is toward the upper end. The before-magnetic head travel portion 15 includes a side wall 15a forming the card travel groove 13, and the side wall 15a is formed with an opening 15b therein. The opening 15b is formed such that the position of the center thereof with respect to the card sliding base surface which is a bottom of the card travel groove 13 is substantially the same as the position of the center of the opening in the magnetic card reader unit 14, through which the magnetic head 17 protrudes into the card travel groove 13, with respect to the card sliding base surface.

The before-magnetic head travel portion 15 has a fixed static elimination member 19 mounted thereon such that a front end of the fixed static elimination member 19 protrudes into the card travel groove 13 through the opening 15b. The fixed static elimination member 19 has a protuberance portion in a center of a square base portion thereof and is shaped such that arm portions extend from opposite ends of the base portion. The arm portions are fixed to bosses 15c erected on the side wall 15a e.g. by screws. The fixed static elimination member 19 is formed of e.g. a spring material having conductivity, whereby when the magnetic card 12 travels in the before-magnetic head travel portion 15, the fixed static elimination member 19 is elastically brought into contact with a side surface of the magnetic card 12.

As illustrated in FIGS. 3 and 4, on an outer surface side of the fixed static elimination member 19, a magnetic card reader fixing bracket 20 is disposed, and the fixed static elimination member 19 is brought into contact with the magnetic card reader fixing bracket 20 in response to the operation of retracting from the card travel groove 13 when the magnetic card 12 travels along the before-magnetic head travel portion 15, and is electrically connected. Further, the protuberance portion of the fixed static elimination member 19 has a cleaning pad 21 as a cleaning member, affixed to a surface thereof. The cleaning pad 21 can be e.g. conductive nonwoven cloth. By using this, when the magnetic card 12 travels in the card travel groove 13, the magnetic card 12 is brought into contact with the fixed static elimination member 19 whereby the magnetic stripe portion is cleaned before it is brought into contact with the magnetic head 17. At the same time, in case the magnetic card 12 has static electricity, the static electricity charge on the magnetic card 12 is eliminated since a pathway is formed for the flow of electricity to the ground via the conductive cleaning pad 21, the fixed static elimination member 19, and the magnetic card reader fixing bracket 20.

Figure 5A:
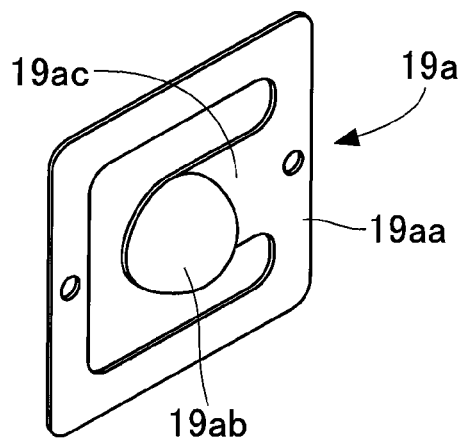
FIG. 5A illustrates a first variation of the fixed static elimination member.
Figure 5B:
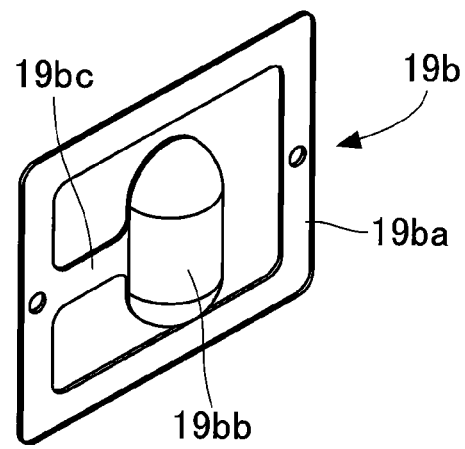
FIG. 5B illustrates a second variation of the fixed static elimination member.
Figure 5C:
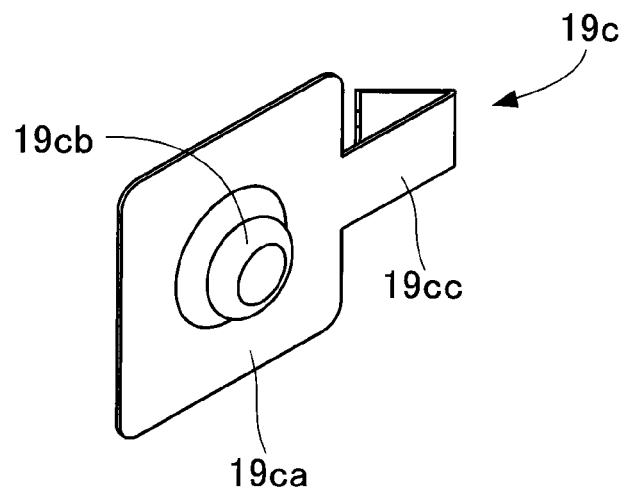
FIG. 5C illustrates a third variation of the fixed static elimination member.

FIG. 5 illustrates variations of the fixed static elimination member, in which FIG. 5A illustrates a first variation of the fixed static elimination member, FIG. 5B illustrates a second variation of the fixed static elimination member, and FIG. 5C illustrates a third variation of the fixed static elimination member. Note that in these variations, the cleaning pad 21 is omitted from illustration.

A fixed static elimination member 19*a* illustrated in FIG. 5A includes a square frame portion 19*aa* fixed to the side wall 15*a* of the before-magnetic head travel portion 15, a protuberance portion 19*ab* which is disposed on the central portion of the frame portion 19*aa* and has a hemispherical shape, and an arm portion 19*ac* connecting these portions, and is formed as a one-piece member of a conductive spring material. The fixed static elimination member 19*a* has the protuberance portion 19*ab* thereof brought into contact with the magnetic card 12 through the opening 15*b* of the side wall 15*a*.

A fixed static elimination member 19*b* illustrated in FIG. 5B includes a square frame portion 19*ba* fixed to the side wall 15*a* of the before-magnetic head travel portion 15, a protuberance portion 19*bb* disposed on the central portion of the frame portion 19*ba*, and an arm portion 19*bc* connecting these portions, and is formed as a one-piece member of a conductive spring material. The protuberance portion 19*bb* has a central portion formed to have a hollow semi-cylindrical shape for being brought into line contact with the magnetic card 12, which increases an area to be brought into contact with the magnetic card 12.

A fixed static elimination member 19*c* illustrated in FIG. 5C includes a square base portion 19*ca*, a protuberance portion 19*cb* disposed on the central portion of the base portion 19*ca*, and an arm portion 19 cc extending from one end of the base portion 19*ca*, and is formed as a one-piece member of a conductive spring material. The arm portion 19 cc has a front end formed into a V-shape, and can be fixed to the before-magnetic head travel portion 15 by the action of a spring of the front end e.g. only by inserting the arm portion 19 cc into a fixing groove formed in the before-magnetic head travel portion 15.

Figure 6:
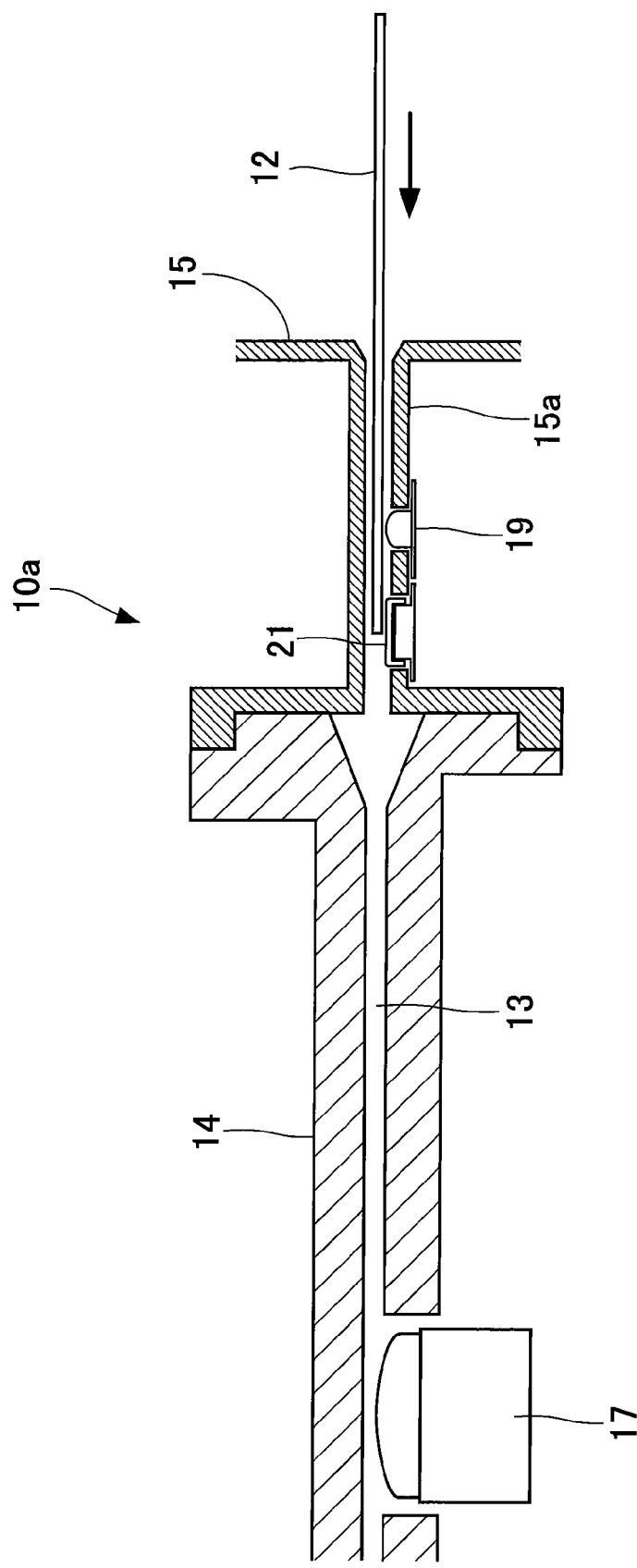
FIG. 6 is a cross-sectional view of part of a magnetic card reader according to a second embodiment, as a horizontal section.

FIG. 6 is a cross-sectional view in a state where part of a magnetic card reader according to a second embodiment, as a horizontal section. Note that in FIG. 6, component elements identical or equivalent to those illustrated in FIG. 2 are denoted by the same reference numerals, and detailed description thereof is omitted.

A magnetic card reader 10*a* according to the second embodiment includes the fixed static elimination member 19 and the cleaning pad 21 which are arranged side by side in a direction of travel of the magnetic card 12. In this case, it is not necessary for the cleansing pad 21 to have conductivity, so that it is possible to use a desired material other than this. The fixed static elimination member 19 is grounded by the magnetic card reader fixing bracket 20, though not illustrated.

When the magnetic card 12 is inserted in the before-magnetic head travel portion 15, first, the magnetic card 12 is brought into contact with the fixed static elimination member 19. At this time, if the magnetic card 12 has static electricity, the static electricity is discharged to the ground via the fixed static elimination member 19 and the magnetic card reader fixing bracket 20. Subsequently, the magnetic card 12 is brought into contact with the cleaning pad 21. When the magnetic card 12 passes the cleaning pad 21, the magnetic stripe portion with which the magnetic head 17 is brought into contact is cleaned. Thereafter, the magnetic card 12 is brought into contact with the magnetic head 17, whereby reading of data is performed. As described above, since the magnetic card 12 is brought into contact with the magnetic head 17 after being cleaned, it is possible to make the magnetic head 17 difficult to get dirty, and therefore, it is possible to extend a time interval or regular maintenance related to cleaning.

Figure 7:
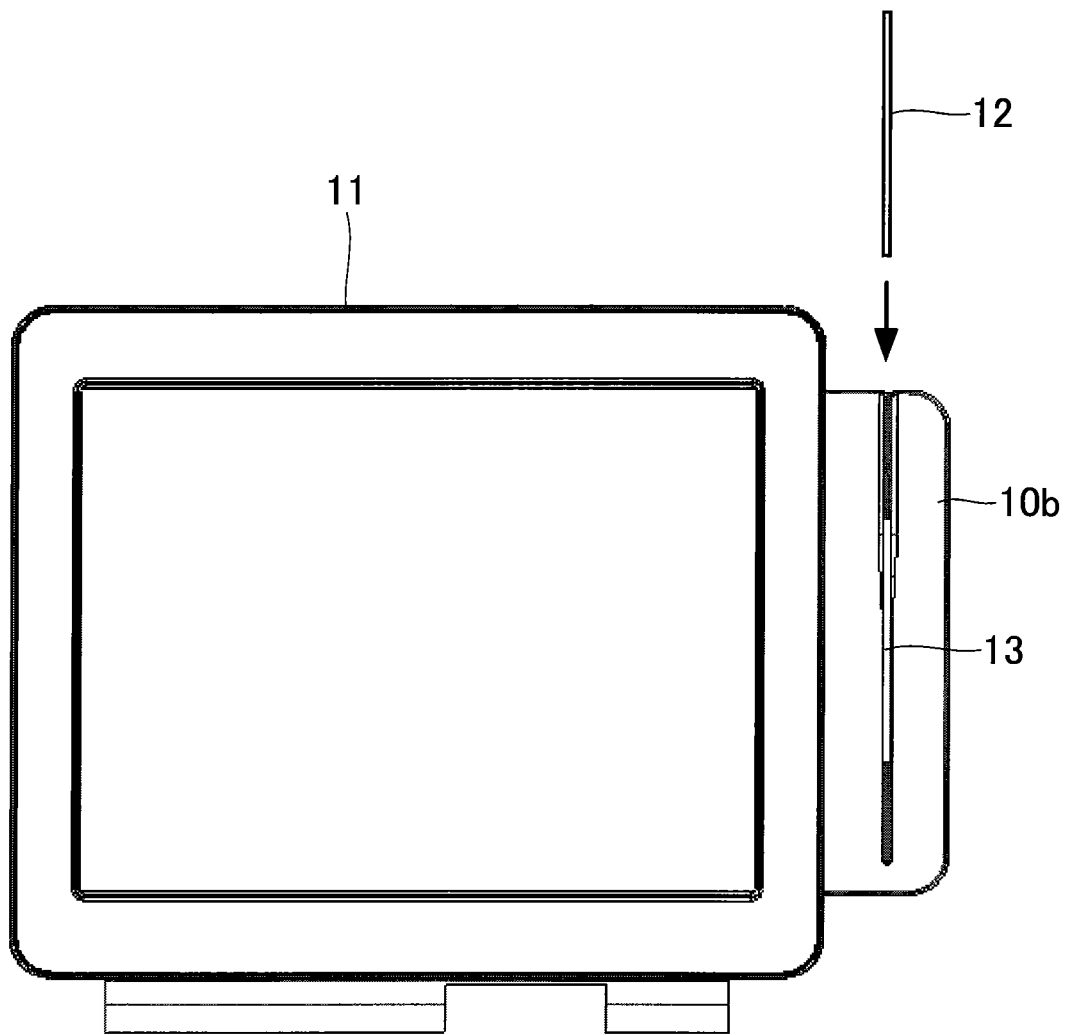
FIG. 7 is a view showing the appearance of an installation example of a magnetic card reader of a type in which a magnetic card is not caused to pass therethrough.
Figure 8:
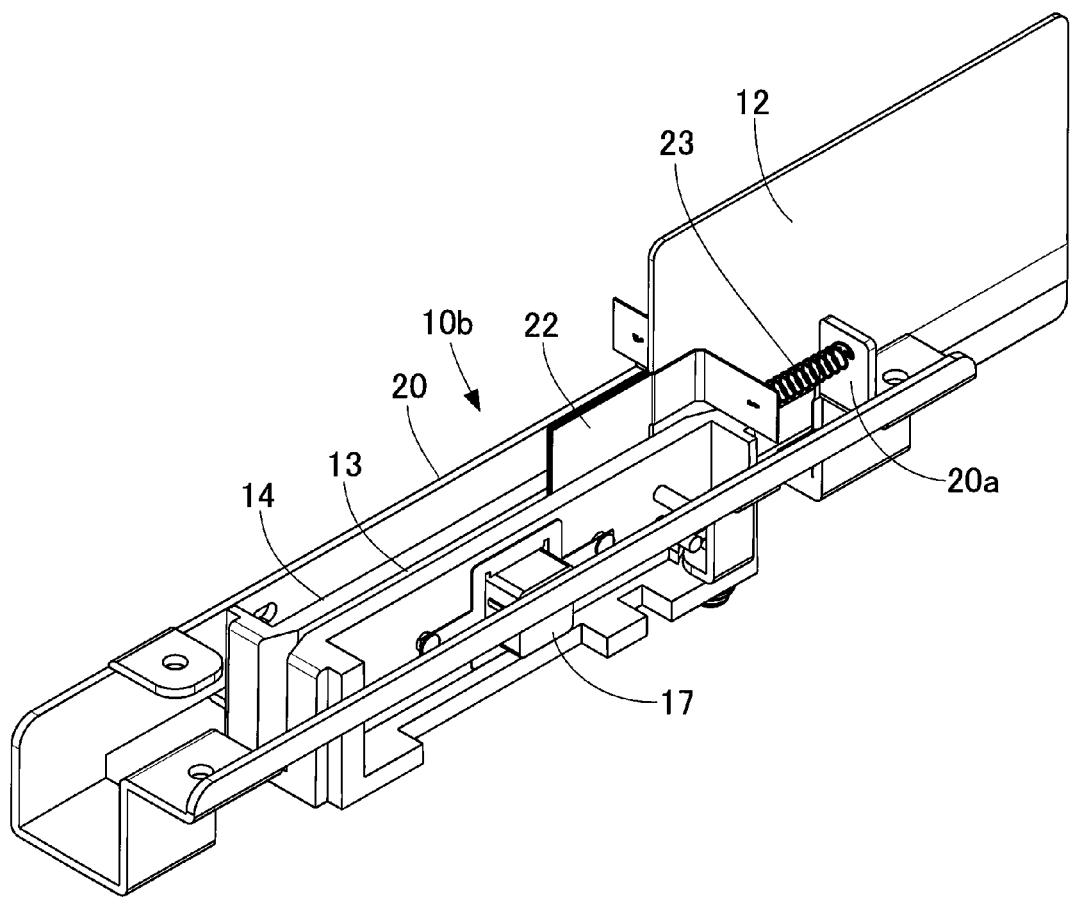
FIG. 8 is a perspective view of a magnet card reader according to a third embodiment in a state of use.
Figure 9:
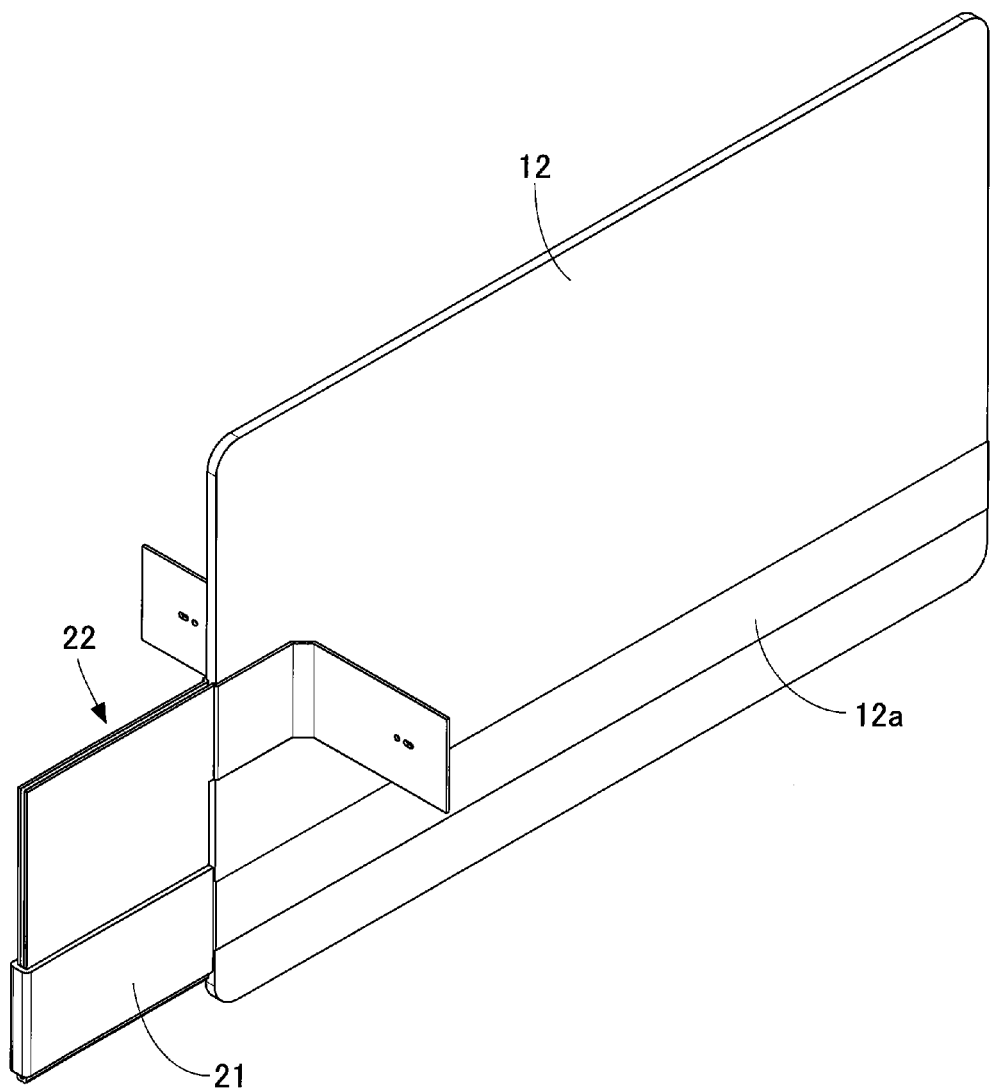
FIG. 9 is a perspective view of a movable static elimination member and the magnetic card in an engaged state.
Figure 10:
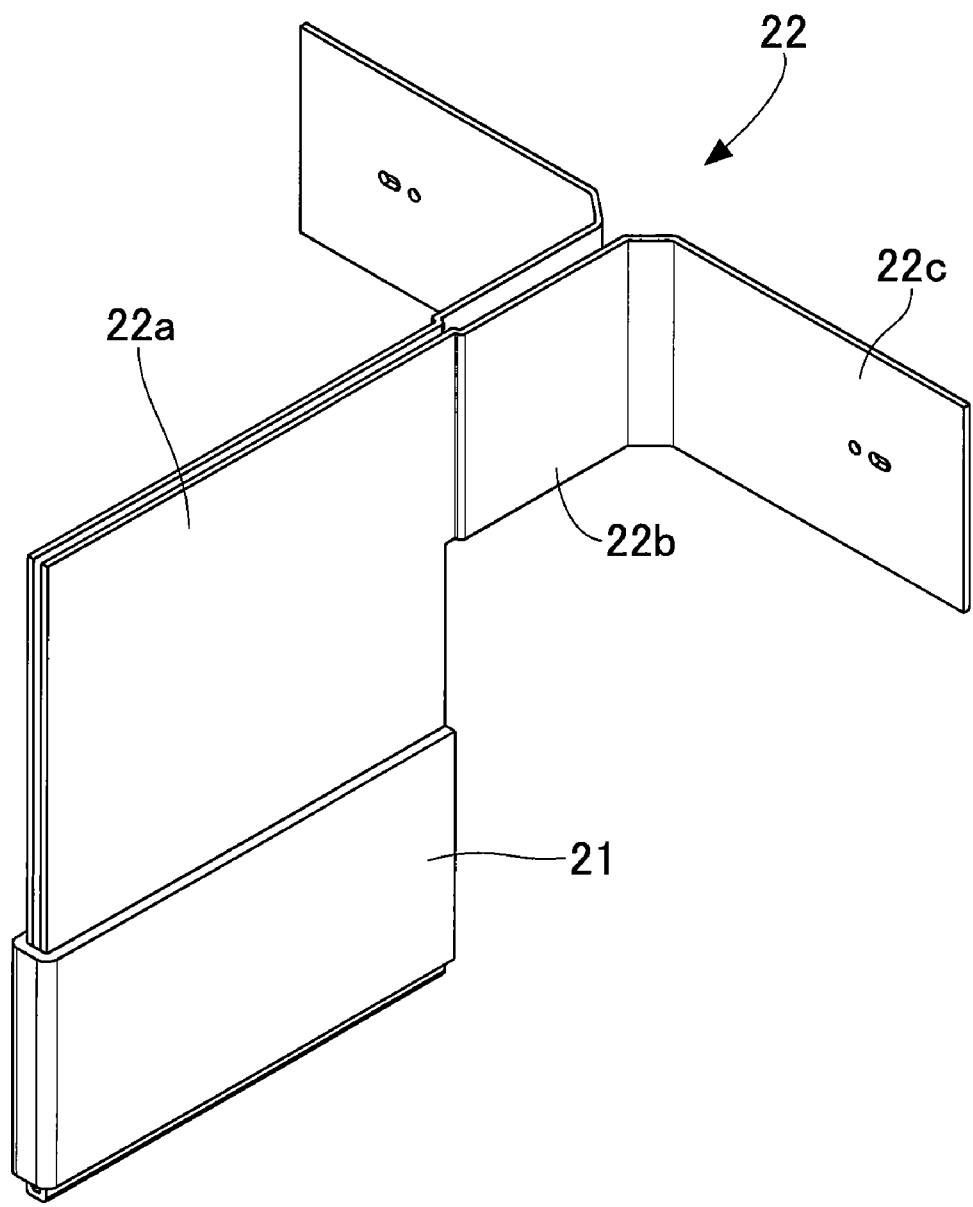
FIG. 10 is a perspective view of the movable static elimination member.

FIG. 7 is a view showing the appearance of an installation example of a magnetic card reader of a type in which a magnetic card is not caused to pass therethrough, FIG. 8 is a perspective view of a magnet card reader according to a third embodiment in a state of use, FIG. 9 is a perspective view of a movable static elimination member and the magnetic card in an engaged state, and FIG. 10 is a perspective view of the movable static elimination member. Note that in FIGS. 7 and 8, component elements identical or equivalent to those illustrated in FIG. 2 are denoted by the same reference numerals, and detailed description thereof is omitted.

A magnetic card reader 10*b* according to the third embodiment has the card travel groove 13 closed at a lower end thereof, as illustrated in FIG. 7. Therefore, a user performs a manual operation such that the magnetic card 12 is caused to travel for reading of data until it is brought into abutment with the end of the card travel groove 13, whereafter the magnetic card 12 is drawn out toward the user for removal.

As illustrated in FIG. 8, the magnetic card reader 10*b* includes a movable static elimination member 22. Note that in FIG. 8, the front cover 18, and the before-magnetic head travel portion 15 and the after-magnetic head travel portion 16 which are integrally formed with the front cover 18 are omitted from illustration. The movable static elimination member 22 is provided such that it can reciprocate in the card travel groove 13 of the magnet card reader unit 14, and an elastic helical extension spring 23 is disposed in a manner extended between a retainer 20*a* of the magnetic card reader fixing bracket 20 and the movable static elimination member 22 such that in a normal standby state for reading of data, the movable static elimination member 22 is moved back toward the before-magnetic head travel portion 15 into which the magnetic card 12 is inserted. The helical extension spring 23 is formed of a spring material having conductivity, such as phosphor bronze.

The movable static elimination member 22, as illustrated in FIGS. 9 and 10, includes a card-leading portion 22*a*, card-holding portions 22*b*, and retaining portions 22*c*, and is formed as a one-piece member by machining a metal plate. The card-leading portion 22*a* is capable of reciprocating by using the card travel groove 13 as a guide, and has the belt-like cleaning pad 21 affixed to a surface of a portion thereof at a location corresponding to a magnetic stripe 12*a* of the magnetic card 12 such that it is wound around the portion. For the cleaning pad 21, nonwoven cloth is used, for example, and the cleaning pad 21 cleans the surface of the magnetic head 17 whenever the operation for reading data of the magnetic card 12 is performed. The card-holding portions 22*b* not only has a function of receiving the inserted magnetic card 12, but also have a function of collecting static electricity charged on the magnetic card 12 and discharging the same from the retaining portions 22*c* to the magnetic card reader fixing bracket 20 via the helical extension spring 23.

It is preferable that the movable static elimination member 22 is formed such that the thickness thereof in a state where the cleaning pad 21 is affixed to the card-leading portion 22*a* is not more than that of the magnetic card 12. Further, although in the present embodiment, the movable static elimination member 22 is formed of a metal plate, the movable static elimination member 22 may be formed of a conductive resin into which conductive particles or fibers are mixed.

According to the magnetic card reader 10*b* having the above-described construction, when the magnetic card 12 is inserted from the before-magnetic head travel portion 15, not illustrated, the magnetic card 12 is received by the card-holding portions 22*b* of the movable static elimination member 22 which has been moved toward the before-magnetic head travel portion 15 by the helical extension spring 23. At this time, if the magnetic card 12 which is brought into contact with the card-holding portions 22*b* has static electricity, the static electricity is discharged to the ground via the retaining sections 22c, the helical extension spring 23, and the magnetic card reader fixing bracket 20. Subsequently, when the magnetic card 12 is caused to travel, the movable static elimination member 22 is caused to travel together with the magnetic card 12, against the urging force of the helical extension spring 23. When the movable static elimination member 22 passes the magnetic head 17, the cleaning pad 21 is brought into contact with the magnetic head 17 to thereby clean the surface of the magnetic head 17. Thereafter, the magnetic card 12 is brought into contact with the magnetic head 17, whereby reading of data is performed. The magnetic card 12 is brought into abutment with the end of the card travel groove 13 after passing the magnetic head 17, and is then drawn out toward the user, whereby the operation for reading the magnetic card 12 is completed.

As described above, the magnetic card 12 is brought into contact with the magnetic head 17 after cleaning the magnetic head 17 by the cleaning pad 21, which prevents dirt from being accumulated on the magnetic head 17, and hence it is possible to eliminate the need for the regular maintenance related to cleaning.

The magnetic card reader constructed as described above has the construction that the static elimination member and the cleaning member are brought into contact with the magnetic card in the card travel groove, or that the static elimination member receives the magnetic card, and hence it is possible to eliminate static electricity on the magnetic card and perform cleaning of the magnetic card or the magnetic head while reducing load on the magnetic card. Since it is possible to eliminate static electricity on the magnetic card, it is possible to prevent the magnetic card from suffering from a reading error due to static electricity, or prevent the magnetic head from being damaged due to static electricity. Further, since the cleaning of the magnetic card or the magnetic head is performed before reading the magnetic card, it is possible to reduce dirt on the magnetic head, which makes it possible to extend a time interval for regular maintenance, such as cleaning of the magnetic head using a cleaning card, or eliminate the need for the regular maintenance.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that various changes, substitutions, and alterations could be made hereto without departing from the spirit and scope of the invention.

What is claimed is:

1. A magnetic card reader that reads data recorded in a magnetic card by inserting the magnetic card in a card travel groove in a travel direction and manually causing the magnetic card to travel along the card travel groove, wherein a static elimination member and a cleaning member are disposed at a location before a magnetic head in a direction of travel of the magnetic card, in a manner protruding into the card travel groove, wherein said static elimination member has conductivity, and is fixed to one of side walls forming the card travel groove at a before-magnetic head travel portion closer to where the magnetic card is inserted than a magnetic card reader unit provided with the magnetic head, in a manner protruding into the card travel groove through an opening formed in the one of the side walls, and said cleaning member is attached to a surface of a side of the static elimination member, which protrudes into the card travel groove, and has conductivity, and wherein a magnetic card reader fixing bracket is arranged on a rear side of said static elimination member, and said static elimination member is electrically connected to said magnetic card reader fixing bracket in response to an operation for causing the magnetic card to travel in the before-magnetic head travel portion, causing said static elimination member to be retracted from the card travel groove.

2. The magnetic card reader according to claim 1, wherein said static elimination member is formed of a spring material having conductivity, and said cleaning member is formed of conductive nonwoven cloth.

3. A magnetic card reader that reads data recorded in a magnetic card by inserting the magnetic card in a card travel groove in a travel direction and manually causing the magnetic card to travel along the card travel groove, wherein a static elimination member and a cleaning member are disposed at a location before a magnetic head in a direction of travel of the magnetic card, in a manner protruding into the card travel groove, wherein said static elimination member having conductivity and said cleaning member are fixed to one of side walls forming the card travel groove at a before-magnetic head travel portion closer to where the magnetic card is inserted than a magnetic card reader unit provided with the magnetic head, such that respective parts of said static elimination member and said cleaning member protrude into the card travel groove through openings formed in the one of the side walls, respectively, and wherein a magnetic card reader fixing bracket is arranged on a rear side of said static elimination member, and said static elimination member is electrically connected to said magnetic card reader fixing bracket in response to an operation for causing the magnetic card to travel in the before-magnetic head travel portion, causing said static elimination member to be retracted from the card travel groove.

4. The magnetic card reader according to claim 3, wherein said static elimination member is formed of a spring material having conductivity, and said cleaning member is formed of nonwoven cloth.

5. A magnetic card reader that reads data recorded in a magnetic card by inserting the magnetic card in a card travel groove in a travel direction and manually causing the magnetic card to travel along the card travel groove, comprising:

a static elimination member configured to travel along with travel of the magnetic card, using the card travel groove of a magnetic card reader unit provided with a magnetic head, as a guide;

a conductive elastic body configured to move back said static elimination member toward a side of the magnetic card reader unit, where the magnetic card is inserted, in a standby state for reading data; and a cleaning member affixed to said static elimination member and configured to clean the magnetic head in accordance with travel of the magnetic card.

6. The magnetic card reader according to claim 5, wherein said static elimination member includes a card-leading portion disposed in a manner capable of reciprocating, using the card travel groove of the magnetic card reader unit, as a guide, and card-holding portions which receive the inserted magnetic card and travel together with the magnetic card, by being led by said card-leading portion, and said cleaning member is affixed to a portion of said card leading portion at a location corresponding to a magnetic stripe of the magnetic card.

7. The magnetic card reader according to claim 5, wherein said static elimination member is formed of a metal plate such that the card-leading portion and the card-holding portions form a one-piece member.

8. The magnetic card reader according to claim 5, wherein said static elimination member is electrically connected to a magnetic card reader fixing bracket via said elastic body.

* * * * *